(12) United States Patent
Hüger et al.

(10) Patent No.: US 9,168,954 B2
(45) Date of Patent: Oct. 27, 2015

(54) METHOD FOR PARKING A VEHICLE AND CORRESPONDING PARKING ASSISTANCE SYSTEM AND VEHICLE

(75) Inventors: Philipp Hüger, Rühen (DE); Ulrich Wuttke, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 219 days.

(21) Appl. No.: 13/697,350

(22) PCT Filed: Mar. 31, 2011

(86) PCT No.: PCT/EP2011/001622
§ 371 (c)(1),
(2), (4) Date: Jan. 18, 2013

(87) PCT Pub. No.: WO2011/141096
PCT Pub. Date: Nov. 17, 2011

(65) Prior Publication Data
US 2013/0116879 A1 May 9, 2013

(30) Foreign Application Priority Data
May 12, 2010 (DE) .......................... 10 2010 020 204

(51) Int. Cl.
| | |
|---|---|
| *B62D 15/02* | (2006.01) |
| *B62D 6/00* | (2006.01) |
| *G08G 1/14* | (2006.01) |
| *G08G 1/16* | (2006.01) |

(Continued)

(52) U.S. Cl.
CPC ........... *B62D 15/0285* (2013.01); *B60W 30/06* (2013.01); *B62D 15/025* (2013.01); *B62D 15/028* (2013.01); *B62D 15/0275* (2013.01); *B62D 1/00* (2013.01); *B62D 15/027* (2013.01)

(58) Field of Classification Search
None
See application file for complete search history.

(56) References Cited

U.S. PATENT DOCUMENTS

| | | | |
|---|---|---|---|
| 6,275,754 B1 * | 8/2001 | Shimizu et al. ................. | 701/41 |
| 7,366,595 B1 * | 4/2008 | Shimizu et al. ............... | 701/301 |
| 2002/0041239 A1 * | 4/2002 | Shimizu et al. ............ | 340/932.2 |

(Continued)

FOREIGN PATENT DOCUMENTS

| | | |
|---|---|---|
| DE | 69714199 T2 | 11/2002 |
| DE | 102007009745 A1 | 9/2008 |

(Continued)

OTHER PUBLICATIONS

Search Report for German Patent Application No. 10 2010 020 204.5; Nov. 16, 2010.

(Continued)

*Primary Examiner* — Calvin Cheung
*Assistant Examiner* — Kevin P Mahne
(74) *Attorney, Agent, or Firm* — Barnes & Thornburg LLP

(57) ABSTRACT

A method to park a vehicle using a parking assistance system, a target position of the vehicle within a parking space is automatically determined. A parking process of the parking assistance system is considered successfully ended when the vehicle reaches the target position. In order to carry out the parking process of the parking assistance system, a steering intervention in a steering system of the vehicle is automatically activated. A state that prevents the target position from being reached is automatically detected during the parking process. Depending on the state, the target position is newly determined and the parking process is continued with the newly determined target position.

25 Claims, 2 Drawing Sheets

(51) Int. Cl.
  *B60W 30/06* (2006.01)
  *B62D 1/00* (2006.01)

(56) References Cited

U.S. PATENT DOCUMENTS

| | | | |
|---|---|---|---|
| 2003/0078713 A1* | 4/2003 | Tanaka et al. | 701/41 |
| 2003/0150661 A1* | 8/2003 | Kataoka et al. | 180/204 |
| 2005/0043871 A1* | 2/2005 | Endo et al. | 701/36 |
| 2005/0049766 A1* | 3/2005 | Tanaka et al. | 701/36 |
| 2006/0136109 A1* | 6/2006 | Tanaka et al. | 701/41 |
| 2007/0088474 A1* | 4/2007 | Sugiura et al. | 701/36 |
| 2007/0146165 A1* | 6/2007 | Tanaka | 340/932.2 |
| 2008/0079607 A1* | 4/2008 | Uemura | 340/932.2 |
| 2008/0154464 A1* | 6/2008 | Sasajima et al. | 701/42 |
| 2009/0091475 A1* | 4/2009 | Watanabe et al. | 340/932.2 |
| 2009/0278709 A1* | 11/2009 | Endo et al. | 340/932.2 |
| 2010/0049402 A1* | 2/2010 | Tanaka | 701/41 |
| 2010/0066825 A1* | 3/2010 | Kuboyama et al. | 348/118 |
| 2010/0076663 A1* | 3/2010 | Jinno et al. | 701/102 |
| 2010/0079307 A1* | 4/2010 | Tanaka et al. | 340/932.2 |
| 2011/0080304 A1* | 4/2011 | Toledo et al. | 340/932.2 |

FOREIGN PATENT DOCUMENTS

| | | |
|---|---|---|
| DE | 102008002598 A1 | 1/2009 |
| DE | 102007045562 A1 | 4/2009 |
| DE | 102007049709 A1 | 4/2009 |
| EP | 1916177 A2 | 4/2008 |
| EP | 2050640 A2 | 4/2009 |

OTHER PUBLICATIONS

Search Report for International Patent Application No. PCT/EP2011/001622; May 26, 2011.

* cited by examiner

METHOD FOR PARKING A VEHICLE AND CORRESPONDING PARKING ASSISTANCE SYSTEM AND VEHICLE

PRIORITY CLAIM

This patent application is a U.S. National Phase of International Patent Application No. PCT/EP2011/001622, filed 31 Mar. 2011, which claims priority to German Patent Application No. 10 2010 020 204.5, filed 12 May 2010, the disclosures of which are incorporated herein by reference in their entirety.

FIELD

Disclosed embodiments relate to a method for semi-automatically carrying out a parking process of a vehicle, and to a corresponding parking assistance system and a corresponding vehicle.

BACKGROUND

According to the prior art, see, for example, DE 10 2007 009 745 A1, it is known to change a parking path as a function of an obstacle which is sensed during the parking.

In contrast, the present invention successfully concludes a parking process even if an obstacle makes it impossible to park on an originally planned position within a parking space.

This is achieved by means of a method for parking a vehicle as claimed in claim 1, by means of a parking assistance system as claimed in claim 6 and by means of a vehicle as claimed in claim 8. The dependent claims disclose various embodiments.

SUMMARY

A method for parking a vehicle using a parking assistance system is made available. The method comprises the following the steps of automatically determining a target position of the vehicle within a parking space. In this context, a parking process of the parking assistance system is considered to be successfully ended if the vehicle reaches the target position; automatically activating a steering intervention of the parking assistance system into a steering system of the vehicle in order to carry out the parking process of the parking assistance system; automatically sensing a state of the vehicle during the parking process (during the activated steering intervention), wherein this vehicle state prevents the target position from being reached by the vehicle; automatically redetermining the target position as a function of the sensed vehicle state; and continuing the parking process with the redetermined target position.

By redetermining the target position when it is sensed that the original target position cannot be reached, the parking process can also in this case be successfully concluded. Since the case in which the original target position can no longer be reached is discovered by sensing of a vehicle state, this case or this vehicle state can advantageously also be sensed in situations which cannot be sensed by sensors which sense the surroundings of the vehicle and which are usually used according to the prior art in such cases. Disclosed embodiments also permit multiple redetermination of the target position. That is to say if it is sensed that a redetermined target position cannot be reached either, the target position is redetermined once more etc. As a result of the redetermination of the target position, the disclosed embodiments also avoid endless attempts to reach a target position which, however, cannot be reached, as is customary according to the prior art.

According to one disclosed embodiment, the parking space is a transverse parking space which is essentially perpendicular to a roadway or road on which the transverse parking space is arranged. According to this disclosed embodiment, the vehicle state which prevents the original target position from being reached is present if a gearspeed change from a reverse gearspeed of the vehicle into a forward gearspeed of the vehicle is performed and sensed at a time at which, on the one hand, the vehicle is located at least partially inside the parking space or at least partially covers the parking space and, on the other hand, there is a sufficiently small oblique position of the vehicle with respect to the transverse parking space but the vehicle has not yet reached the target position or the end of the first maneuver. The vehicle state is present, for example, if the gearspeed change from the reverse gearspeed to the forward gearspeed takes place contrary to an instruction (in particular a travel direction display) of the assistance system. That is to say the vehicle state is present if the assistance system still displays further reverse travel of the vehicle via the travel direction display but the driver has already engaged the forward gearspeed, with the result that the vehicle is moved forwards too early.

If the driver of the vehicle performs a gearspeed change during a semi-automatic parking process before the target position has been reached, without deactivating the parking assistance system, this may generally be due to the fact that the driver has recognized an obstacle (for example a curb) which was until then not detected by the sensors for the vehicle. Since the vehicle is usually right next to this obstacle in this state (during the gearspeed change), it is advantageous to perform the new target position as a function of this vehicle state, i.e. of the current position of the vehicle.

According to this disclosed embodiment, the vehicle covers a part of the parking space if a difference, which is defined between the front end of the parking space and the position of the center of a rear axle of the vehicle, has a positive value (i.e. the center of the rear axle is already located inside the parking space or the center of the rear axle has moved into the parking space during the parking via the front end of the parking space). In this context, the position of the center of the rear axle with respect to a co-ordinate system determines which positions negative y values have within the parking space. For this reason, the difference is positive if the center of the rear axle is located inside the parking space. A sufficiently small oblique position of the vehicle with respect to the transverse parking space is present according to this disclosed embodiment if an angle between the longitudinal axis of the vehicle and the longitudinal axis of the parking space is smaller than a predetermined angle (for example 15°).

The target position can comprise here a target distance which is defined between the front end of the parking space and the setpoint position of the center of the rear axle. This target distance is redetermined as a function of the current position of the vehicle during the gearspeed change by determining the target distance equal to the distance between the front end of the parking space and the current position of the center of the rear axle minus a predetermined offset (for example 30 cm).

In another disclosed embodiment, the target position is defined with respect to the center of the rear axle. As a result, the target position is defined, on the one hand, by the target distance from the front end or from the rear edge of the parking space, wherein the target distance extends along the longitudinal axis of the parking space, while the front end or front boundary of the parking space is substantially perpendicular to this longitudinal axis. On the other hand, the target position is defined by a distance from the lateral boundaries of the parking space, which extends substantially parallel to the longitudinal axis of the parking space. In the case of a transverse parking space, usually only the target distance but not the distance between the new target position and the lateral boundaries of the parking space advantageously changes owing to the obstacle which is sensed by means of the vehicle state. As a result of the predetermined offset, when the target position is reached the vehicle is at a sufficiently large distance from the obstacle for example curb).

Assuming that the target position defines a setpoint position of the center of the rear axle of the vehicle, the parking process is then considered to be successfully concluded if the following three conditions are met:

A distance between the current position of the center of the rear axle and the target position along the longitudinal axis of the parking space is below a first threshold value. That is to say the vehicle or the center of the rear axle has reached the (redetermined) target distance.

A distance between the current position of the center of the rear axle and the target position perpendicular to the longitudinal axis of the parking space is below a second threshold value, which is, for example, 8 cm.

The angle between the longitudinal axis of the vehicle and the longitudinal axis of the parking space is smaller than a third threshold value, which is, for example 2°.

A parking assistance system for a vehicle is also made available. In this context, the parking assistance system comprises a controller, at least one sensor for sensing the surroundings of the vehicle and at least one state-sensing sensor. A target position of the vehicle inside a parking space is determined with the at least one sensor. Using the at least one state-sensing sensor, the vehicle state which prevents the target position from being reached is sensed. By means of the controller, steering intervention of the assistance system into a steering system of the vehicle is activated in order thereby to carry out the parking process of the parking assistance system successfully. The target position is redetermined as a function of the sensed vehicle state, and the parking process is continued with the redetermined target position.

The advantages of the parking assistance system correspond substantially to the advantages of the method which are explained above in detail, and therefore a repetition is not given here.

Also disclosed is a vehicle which comprises a parking assistance system.

The disclosed embodiments are suitable, in particular, for vehicles having a parking assistance system for carrying out semi-automatic parking into a transverse parking space. Of course, the present invention is not restricted to this field of application since the present invention can also be used during parking in a longitudinal parking space. Furthermore, the present invention can in principle at least also be used in ships and aircraft.

BRIEF DESCRIPTION OF FIGURES

In the text which follows, the present invention will be described in detail by means of disclosed embodiments and with respect to the figures.

DETAILED DESCRIPTION OF DISCLOSED EMBODIMENTS

Figure 1:
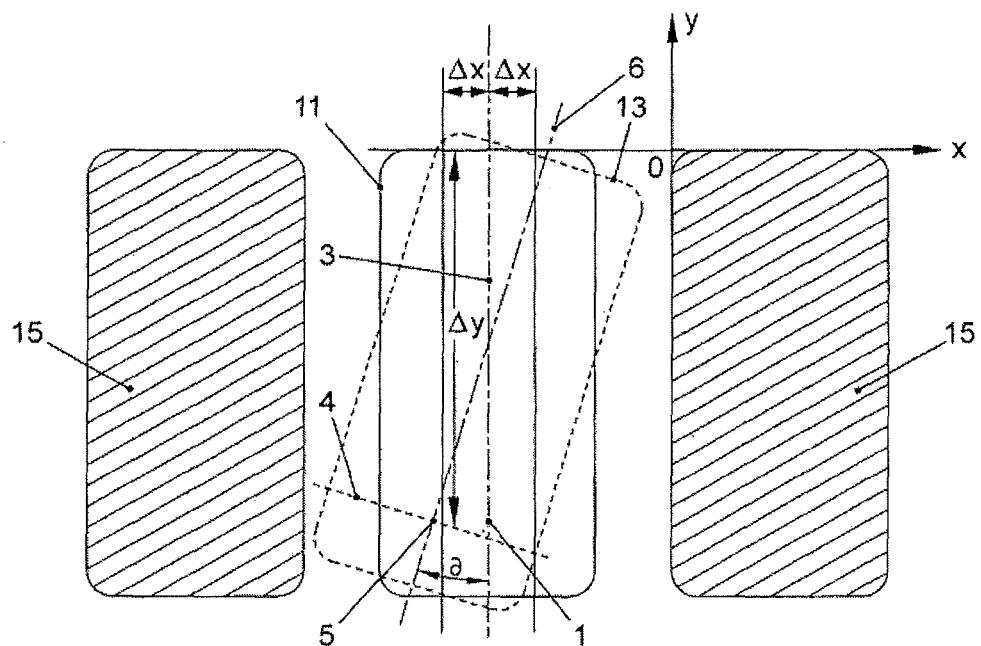
FIG. 1 illustrates the conditions under which a target position inside a parking space is reached.

The three conditions which have to be met for a semi-automatic parking process to be considered to be successfully ended are explained with reference to FIG. 1. FIG. 1 shows a target position 1 which is associated with a vehicle 11 which is illustrated by means of its outline in FIG. 1. A vehicle 13, which has not yet successfully ended the semi-automatic parking process is illustrated as a dashed outline 13.

The target position 1 relates to a center 5 of a rear axle 4 of the vehicle 13 which is to be parked. That is to say the target position 1 is considered to be reached if the center 5 of the rear axle 4 has reached the target position 1 with certain tolerances (threshold values).

The three above-mentioned conditions follow.

The vehicle 13 is in a target corridor which is defined by the longitudinal axis 3 of the parking space and a parameterizable distance $\Delta x$ (for example 8 cm). In other words, a distance between the current position of the center 5 of the rear axle 4 of the vehicle 13 and the target position 1 perpendicular to the longitudinal axis 3 of the parking space is shorter than the distance $\Delta x$.

The condition 1 is not met in FIG. 1.

The oblique position of the vehicle 13 is smaller than a parameterizable angle (for example 2.0°). In other words, the angle $\delta$ between the longitudinal axis 6 of the vehicle 13 and the longitudinal axis 3 of the parking space is smaller than the parameterizable angle.

This condition 2 is not met in FIG. 1 either.

The front of the vehicle 13 is flush with the zero point shown in FIG. 1 or the illustrated x axis. In other words, a distance between the current position of the center 5 of the rear axle 4 and the target position 1 in the direction of the longitudinal axis 3 of the parking space is smaller than a further parameterizable distance (for example 5 cm).

This condition 3 is met in FIG. 1.

Since two conditions are not met with respect to the vehicle 13, the parking process is not successfully ended.

Figure 2:
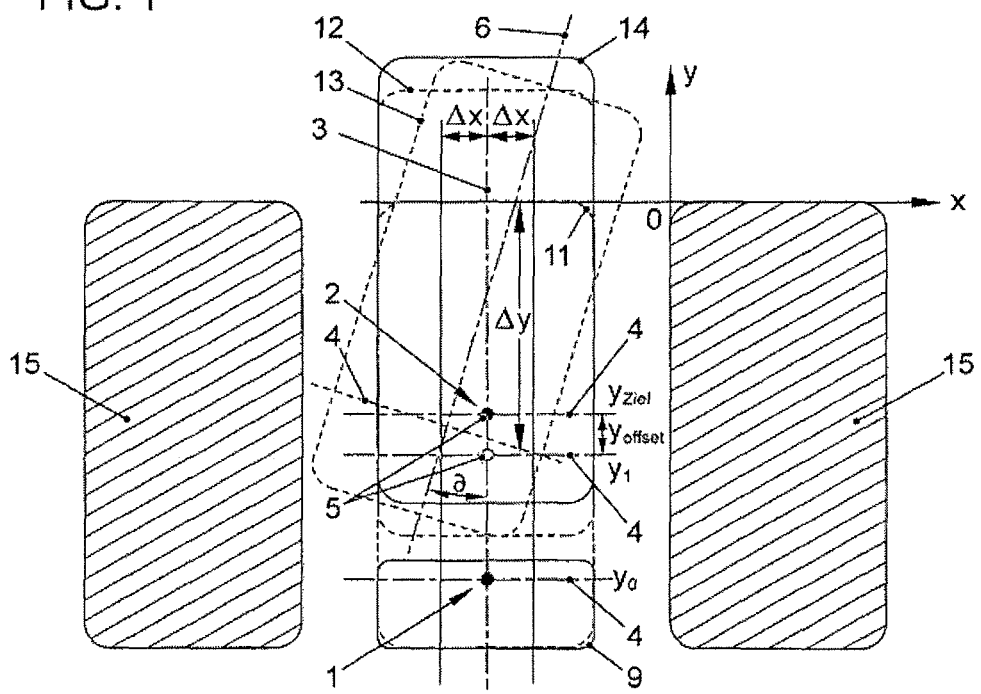
FIG. 2 illustrates how a target position is redetermined by means of an obstacle.

The redetermination of the target position 1; 2 will be explained with respect to FIG. 2. In FIG. 2, vehicles 11-14 are in turn illustrated in various situations via their outline 11-14. A vehicle 11 is illustrated in the originally planned target position 1 with the dotted outline 11. A vehicle 12 is illustrated in the position or at the time at which redetermination of the target position 1,2 takes place, with the faint continuous outline 12. The vehicle 13 with the dashed outline 13 shows a vehicle in which the conditions for successfully ending the parking process are not yet met. Finally, the vehicle 14 with the outline 14 in bold shows a vehicle which is successfully parked with respect to the new target position 2. The remaining reference signs which are not discussed with respect to FIG. 2 correspond to elements which have been explained with FIG. 1.

A parking process will be explained below with respect to FIG. 2.

When a vehicle travels past the transverse parking space between two parked vehicles 15, the transverse parking space is measured and the target position 1 is defined for the center 5 of the rear axle 4. After the reverse gearspeed has been engaged and the parking assistance system has been manually activated, the parking assistance system takes over, by means of the steering intervention, the steering system or lateral guidance of the vehicle, while the longitudinal guidance (i.e. accelerating, braking and gearspeed changes) are still the driver's responsibility.

During parking into the parking space, the driver notices an obstacle 9, in this case a curb 9, with the result that he brakes the vehicle. The parking assistance system senses that the vehicle 12 is not yet located at the target position 1 and that the driver is carrying out a gearspeed change from the reverse gearspeed into the forward gearspeed of the vehicle. That is to say the parking assistance system senses the gearspeed change contrary to the current instruction of the parking assistance system to continue driving the vehicle 10 in reverse. Subsequently, the parking assistance system checks whether the vehicle 12 has a sufficiently small oblique position (for example less than 15°) with respect to the longitudinal axis 3 of the parking space and whether the vehicle is already located with the center 5 of the rear axle 4 inside the parking space (i.e. Δy≥0). Δy corresponds here to the difference between the y value of the x axis (as the front edge or boundary of the parking space) and the y value y1 of the current position of the center 5 of the rear axle 4 of the vehicle 12. Since the co-ordinate system is, as illustrated in FIG. 2, arranged in such a way that positions inside the parking space have negative y values, the difference Δy is positive if the center 5 of the rear axle 4 of the vehicle 12 is located inside the parking space. With respect to the position and the location of the vehicle 12 both the condition relating to the oblique position (δ☐15°) and the condition relating to the difference (Δy≥0) are met. Therefore, the parking assistance system redetermines the target position with respect to its y value. The new y value of the new target position 2 is obtained from a sum of the current y value y1 of the current position of the center 5 of the rear axle 4 of the vehicle 12 and an offset yoffset (for example 30 cm), with the result that ytarget is obtained as a new y value for the new target position 2.

The parking assistance system which continues to be active now attempts to reach the new target position 2. For the case illustrated in FIG. 2, the vehicle 12 must now merely move straight forwards by the offset (for example 30 cm) in order to successfully conclude the parking process.

Figure 3:
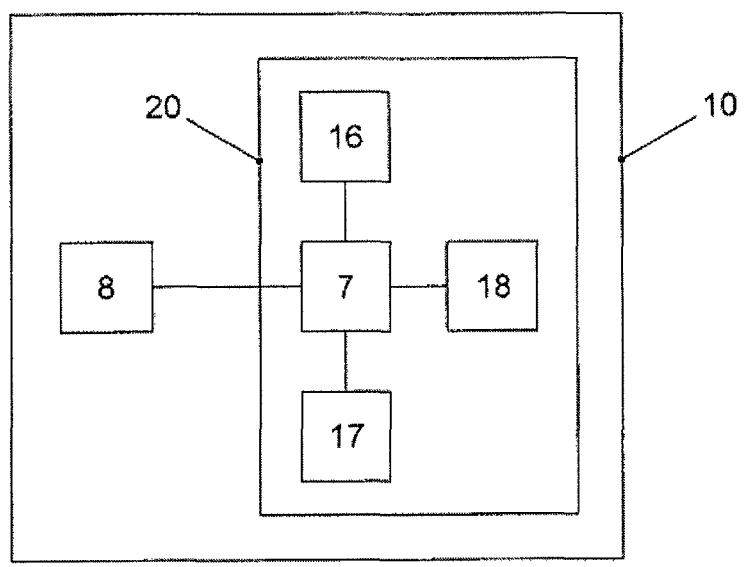
FIG. 3 is a schematic view of a vehicle with a parking assistance system.

FIG. 3 is a schematic illustration of the vehicle 10 which comprises a steering system 8 in addition to a parking assistance system 20. The parking assistance system 20 comprises, for its part, a controller 7, at least one surroundings sensor 16, a position determining sensor 17 and a gearspeed change sensing sensor 18. With the surroundings sensor or sensors 16, the parking assistance system 20 measures parking spaces in order to determine a target position 1. The parking assistance system 20 uses the position determining sensor 17 to determine the current position of the vehicle 10 in order, for example, to decide whether a parking process has been successfully concluded. The parking assistance system 20 uses the gearspeed sensing sensor 18 to sense a gearspeed change of the vehicle 10, for example from the reverse gearspeed into the forward gearspeed. During a parking process by means of the parking assistance system 20, the controller 7 intervenes in the steering system 8 of the vehicle 10.

The invention claimed is:

1. A method for facilitating parking a vehicle using a parking assistance system, the method comprising:

automatically determining a target position of the vehicle within a parking space, wherein, when the target position is reached by the vehicle, a parking process of the parking assistance system is successfully ended;

automatically activating a steering intervention into a steering system of the vehicle to carry out the parking process of the parking assistance system;

automatically sensing, during the parking process, a gear speed change of the vehicle sensed at a time at which the vehicle covers at least part of the parking space, the gear speed change preventing: the target position from being reached;

automatically redetermining a different target position within the parking space as a function of the gear speed change in response to the automatic sensing of the gear speed change of the vehicle; and automatically continuing the parking process with the different target position which has been redetermined in response to the automatic redetermination of the different target position.

2. The method of claim 1, wherein the parking space is a transverse parking space, and the gearspeed change is from a reverse gearspeed of the vehicle into a forward gearspeed of the vehicle is sensed at a time at which the vehicle covers at least part of the parking space and there is a no more than a required oblique position of the vehicle with respect to the parking space.

3. The method of claim 2, wherein the vehicle covers at least a part of the parking space if a difference (Δy), which is defined between a front end (x) of the parking space and a rear axle of the vehicle, is positive, and the required oblique position of the vehicle with respect to the parking space is present if an angle (δ) between a longitudinal axis of the vehicle and a longitudinal axis of the parking space is smaller than a predetermined angle.

4. The method of claim 3, wherein the target position corresponds to a target distance, which is defined between a rear axle of the vehicle and a front end (x) of the parking space, and wherein the target distance is redetermined as a function of the gear change.

5. The method of claim 4, wherein the target distance is determined such that it is equal to a distance between a current position of the rear axle of the vehicle and the front end (x) of the parking space minus a predetermined offset ($y_{offset}$).

6. The method of claim 2, wherein the target position corresponds to a target distance, which is defined between a rear axle of the vehicle and a front end (x) of the parking space, and wherein the target distance is redetermined as a function of the gear speed change.

7. The method of claim 6, wherein the target distance is determined such that it is equal to a distance between a current position of the rear axle of the vehicle and the front end (x) of the parking space minus a predetermined offset ($y_{offset}$).

8. The method of claim 1, wherein the target position defines a target vehicle rear axle position, and the parking process is deemed to have been successfully ended if the following three conditions are met:

a distance between a current position of the rear axle and the target vehicle rear axle position in the direction of a longitudinal axis of the parking space is below a first threshold value, a distance between the current position of the rear axle and the target vehicle rear axle position in the direction perpendicular to the longitudinal axis of the parking space is below a second threshold value (Δx), and an angle (δ) between a longitudinal axis of the vehicle and the longitudinal axis of the parking space is smaller than a third threshold value.

9. The method of claim 1, wherein the park assist system remains active while automatically sensing the gear speed change, automatically redetermining a different target position, and automatically continuing the parking process.

10. The method of claim 1, wherein automatically determining a target position of the vehicle determines a first target position, and
automatically redetermining a different target position determines a second target position.

11. A parking assistance system for a vehicle, the parking assistance system comprising:
a controller;
at least one sensor that measures surroundings of the vehicle; and
a gear change sensor that senses a gear change of the vehicle when the vehicle covers at least part of a parking space,
wherein the controller activates a steering intervention of the assistance system into a steering system of the vehicle to carry out the parking process of the parking assistance system,
wherein the at least one sensor is configured to determine a target position of the vehicle inside the parking space, wherein, when the target position is reached by the vehicle, the controller ends a parking process of the parking assistance system,
wherein the gear change sensor is configured to sense, during the parking process, a gear change of the vehicle which prevents the vehicle from reaching the target position, and
wherein the controller redetermines a different target position inside the parking space as a function of the gear change in response to the sensing of the vehicle gear change and automatically continues the parking process with the redetermined different target position in response to the automatic redetermination of the target position.

12. The parking assistance system of claim 11, wherein the parking assistance system is configured to:
determine a target position of the vehicle within a parking space, wherein, when the target position is reached by the vehicle, a parking process of the parking assistance system is successfully ended;
activate a steering intervention into a steering system of the vehicle to carry out the parking process of the parking assistance system;
sense, during the parking process, a gear change of the vehicle which prevents the target position from being reached;
redetermine the target position as a function of the gear change; and
continue the parking process with the target position which has been redetermined.

13. The parking assistance system of claim 12, wherein the target position determination, steering intervention activation, sensing, redetermining and continuing of a parking process are performed on an automated basis.

14. The parking assistance system of claim 13, wherein the parking space is a transverse parking space, and the gear change is a gearspeed change from a reverse gearspeed of the vehicle into a forward gearspeed of the vehicle sensed at a time at which the vehicle covers at least part of the parking space and there is a no more than a required oblique position of the vehicle with respect to the parking space.

15. The parking assistance system of claim 14, wherein the vehicle covers at least a part of the parking space if a difference ($\Delta y$), which is defined between a front end (x) of the parking space and a rear axle of the vehicle, is positive, and the required oblique position of the vehicle with respect to the parking space is present if an angle ($\delta$) between a longitudinal axis of the vehicle and a longitudinal axis of the parking space is smaller than a predetermined angle.

16. The parking assistance system of claim 13, wherein the target position corresponds to a target distance, which is defined between a rear axle of the vehicle and a front end (x) of the parking space, and wherein the target distance is redetermined as a function of the gear change.

17. The parking assistance system of claim 13, wherein the target position defines a target vehicle rear axle position, and the parking process is deemed to have been successfully ended if the following three conditions are met:
a distance between a current position of the rear axle and the target vehicle rear axle position in the direction of a longitudinal axis of the parking space is below a first threshold value,
a distance between the current position of the rear axle and the target vehicle rear axle position in the direction perpendicular to the longitudinal axis of the parking space is below a second threshold value ($\Delta x$), and
an angle ($\delta$) between a longitudinal axis of the vehicle and the longitudinal axis of the parking space is smaller than a third threshold value.

18. The parking assistance system of claim 13, wherein the target position corresponds to a target distance, which is defined between a rear axle of the vehicle and a front end (x) of the parking space, and wherein the target distance is redetermined as a function of the gear change.

19. The parking assistance system of claim 13, wherein the target distance is determined such that it is equal to a distance between a current position of the rear axle of the vehicle and the front end (x) of the parking space minus a predetermined offset ($y_{offset}$).

20. The parking assistance system of claim 11, wherein the at least one sensor is configured to determine a target position, the target position being a first target position, and
the controller redetermines a different target position, the different target position being a second target position.

21. A vehicle comprising:
a steering system; and
a parking assistance system that includes a controller, at least one sensor that measures surroundings of the vehicle and a gear change sensor:
wherein the at least one sensor is configured to determine a target position of the vehicle inside a parking space, wherein, when the target position is reached by the vehicle, the controller ends a parking process of the parking assistance system,
wherein the gear change sensor is configured to sense, during the parking process, a gear change of the vehicle which prevents the vehicle from reaching the target position,
wherein the controller activates a steering intervention of the assistance system into the steering system of the vehicle to carry out the parking process of the parking assistance system, and
wherein the controller redetermines a different target position inside the parking space as a function of the gear change in response to the sensing of the vehicle gear change and automatically continues the parking process with the redetermined different target position in response to the automatic redetermination of the target position.

22. The vehicle of claim 21, wherein the at least one sensor is configured to determine a target position, the target position being a first target position, and
the controller redetermines a different target position, the different target position being a second target position.

23. A vehicle comprising:
a steering system; and
a parking assistance system,
wherein the parking assistance system is configured to:
- determine a target position of the vehicle within a parking space, wherein, when the target position is reached by the vehicle, a parking process of the parking assistance system is successfully ended;
- activate a steering intervention into a steering system of the vehicle to carry out the parking process of the parking assistance system;
- sense, during the parking process, a gear change of the vehicle which prevents the target position from being reached;
- automatically redetermine a different target position within the parking space as a function of the gear change in response to the sensing of the vehicle gear change; and
- automatically continue the parking process with the different target position which has been redetermined in response to the automatic redetermination of the target position.

24. The vehicle of claim 23, wherein the target position determination, steering intervention activation, sensing, redetermining and continuing of a parking process are performed on an automated basis.

25. The vehicle of claim 23, wherein the at least one sensor is configured to determine a target position, the target position being a first target position, and
the controller redetermines a different target position, the different target position being a second target position.

* * * * *